United States Patent
Yang

(10) Patent No.: US 9,857,513 B2
(45) Date of Patent: Jan. 2, 2018

(54) LIGHT DEVICE FACILITATING REPLACEMENT OF LIGHT SOURCES THEREOF

(71) Applicant: TAYIH LUN AN CO., LTD., Tainan (TW)

(72) Inventor: Chih-Yuan Yang, Tainan (TW)

(73) Assignee: TAYIH KENMOS AUTO PARTS CO., LTD., Tainan (TW)

( * ) Notice: Subject to any disclaimer, the term of this patent is extended or adjusted under 35 U.S.C. 154(b) by 35 days.

(21) Appl. No.: 15/080,598

(22) Filed: Mar. 25, 2016

(65) Prior Publication Data
US 2017/0276855 A1 Sep. 28, 2017

(51) Int. Cl.
*F21V 7/04* (2006.01)
*F21V 8/00* (2006.01)

(52) U.S. Cl.
CPC ........... *G02B 6/0006* (2013.01); *G02B 6/001* (2013.01)

(58) Field of Classification Search
CPC ............................... G02B 6/001; G02B 6/0006
See application file for complete search history.

(56) References Cited

U.S. PATENT DOCUMENTS

2003/0076691 A1* 4/2003 Becks .................. F21L 14/023
362/555
2007/0263385 A1* 11/2007 Fan ......................... G09F 13/22
362/249.16

* cited by examiner

*Primary Examiner* — Ali Alavi

(57) ABSTRACT

A light device includes a controller, a light-guiding tube, two holders, and two cables. Each of the two holders defines therein a receiving space, in which an LED unit is provided to serve as a light source. The two holders are detachably mounted over two ends of the light-guiding tube, respectively, such that the LED unit located in each holder faces one end of the light-guiding tube, so that light rays emitting from each LED unit may enter the light-guiding tube. Each of the two cables is provided between one of the two holders and the controller for detachably connecting the LED unit located in the holder with the controller. When an LED unit fails, the corresponding holder with the failed LED unit therein can be removed from the light-guiding tube and the associated cable to be replaced with a new one, thus facilitating repair and saving the cost.

2 Claims, 5 Drawing Sheets

LIGHT DEVICE FACILITATING REPLACEMENT OF LIGHT SOURCES THEREOF

BACKGROUND OF THE INVENTION

1. Field of the Invention

This invention relates to a light device, which facilitates replacing light sources thereof.

2. Description of the Prior Art

Currently, lightbulbs used in lighting devices have been gradually replaced by LEDs (Light Emitting Diode) because LEDs are small in size and have a long Lifespan. As shown on FIG. 1, a conventional lighting device for a vehicle is shown, which includes an elongated circuit board 10 provided with a plurality of LEDs 11 thereon, a transparent housing 12 enclosing the circuit board 10, and a cable 13 inserted into the housing 12 for electrically connected with the circuit board 10. The light emitting from the LEDs 11 on the circuit board 10 can pass through the housing 12 to appear as a long strip of light for the purpose of illumination or warning, however, the repair cost of the lighting device is high because all of the LEDs 11 ought to be replaced even though only one LED is damaged. If one of the LEDs 11 is not functioning, the location of the failed LED will become a discontinuation point and this may affect the lighting distribution. To repair the lighting device, the entire device should be replaced but most components of the lighting device are still in a good condition.

SUMMARY OF THE INVENTION

One object of this invention is to provide a light device, which can overcome the shortcomings of the conventional lighting device when replacing the LEDs thereof. The light device includes a controller, a light-guiding tube, two holders, and two cables. Each of the two holders defines therein a receiving space, in which an LED unit is provided to serve as a light source. The two holders are detachably mounted over two ends of the light-guiding tube, respectively, such that the LED unit located in each holder faces one end of the light-guiding tube, so that light rays emitting from the LED unit may enter the light-guiding tube. Each of the two cables is provided between one of the two holders and the controller for detachably connecting the LED unit located in the holder with the controller.

Furthermore, each of the two holders can be provided with two spaced-apart holding walls which surround the receiving space to facilitate the holder to be detachably mounted over one end of the light-guiding tube.

BRIEF DESCRIPTION OF DRAWINGS

This invention will be better understood by referring to the accompanying drawings, wherein.

DETAILED DESCRIPTION OF THE PREFERRED EMBODIMENTS

Figure 1:
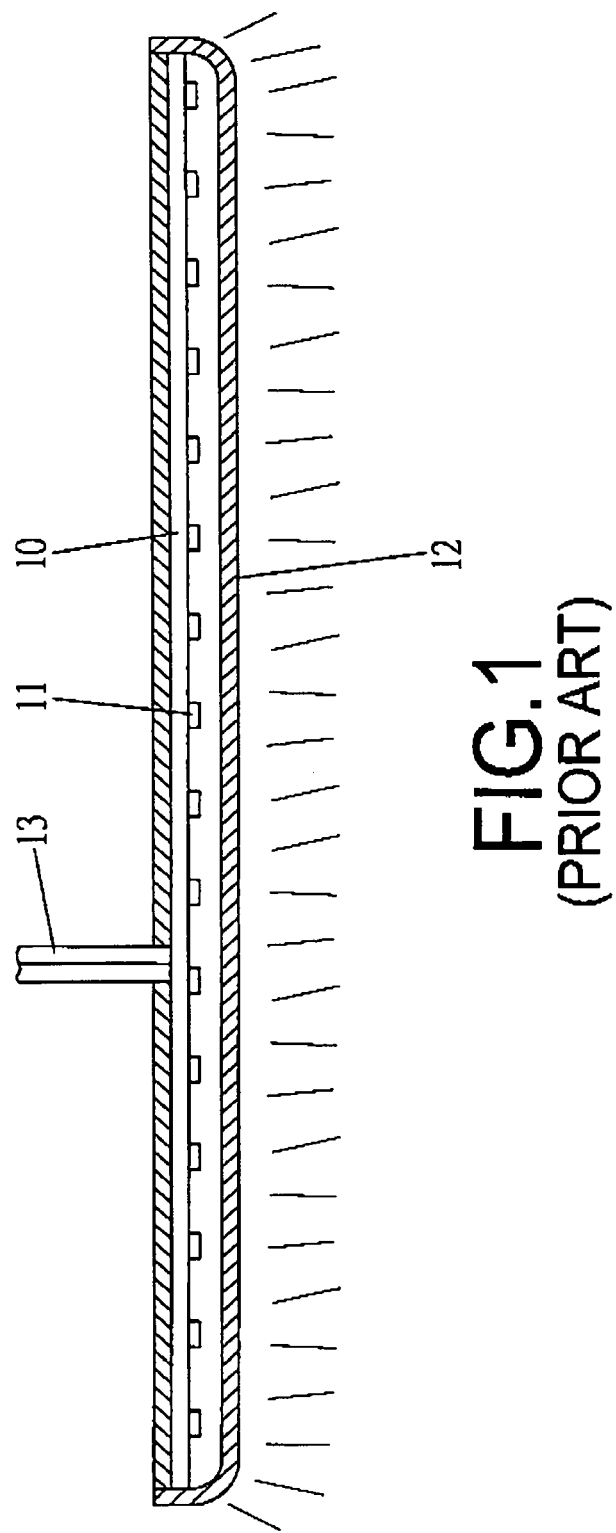
FIG. 1 is a schematic view of a conventional lighting device.
Figure 2:
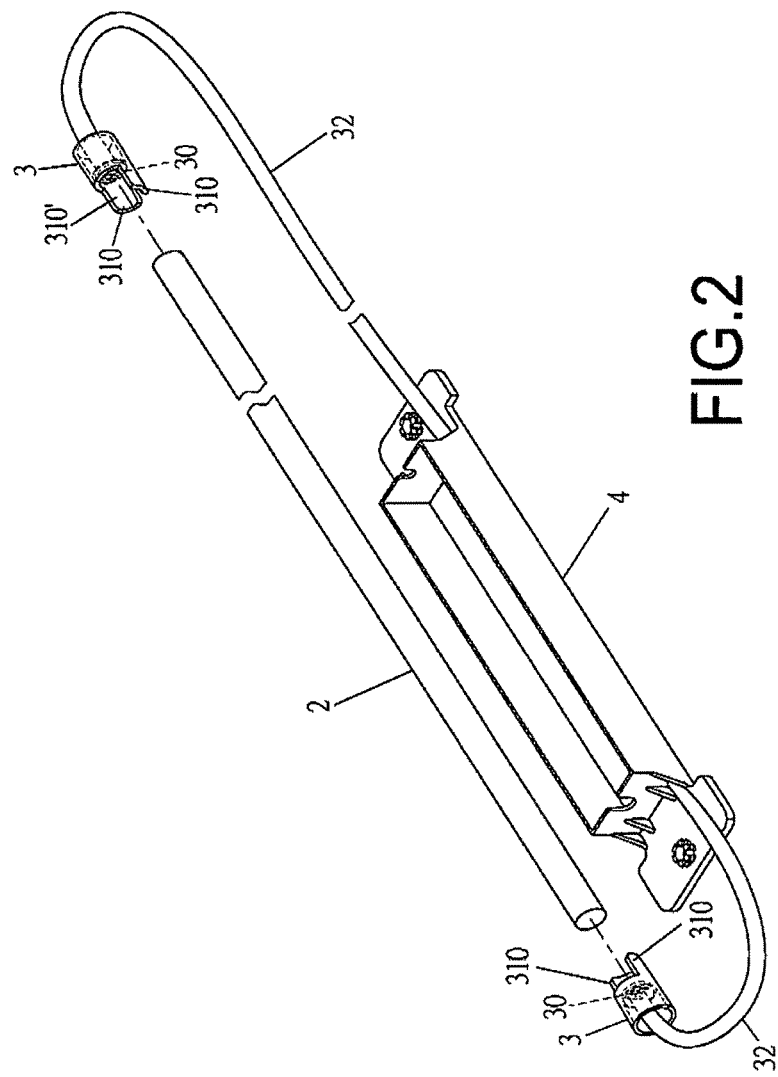
FIG. 2 is an exploded perspective view of a light device according to one embodiment of the present invention.

A light device of the present invention, referring to FIG. 2, includes a light-guiding tube 2, a controller 4, two holders 3, and two cables 32. Each of the two holders 3 defines therein a receiving space 310', in which an LED unit 30 is provided to serve as a light source. Preferably, each of the two holders 3 is provided with two spaced-apart holding walls 310, which surrounds the receiving space 310' to facilitate mounting the holder over one end of the light-guiding tube 2.

Figure 3:
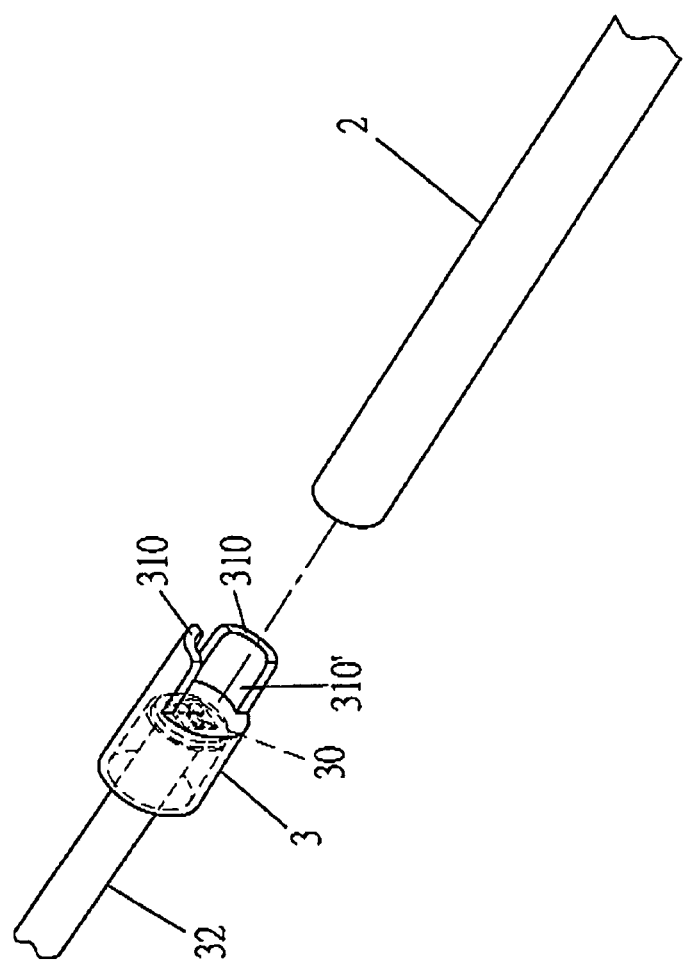
FIG. 3 is a partially enlaraged, exploded perspective view of the light device.
Figure 4:
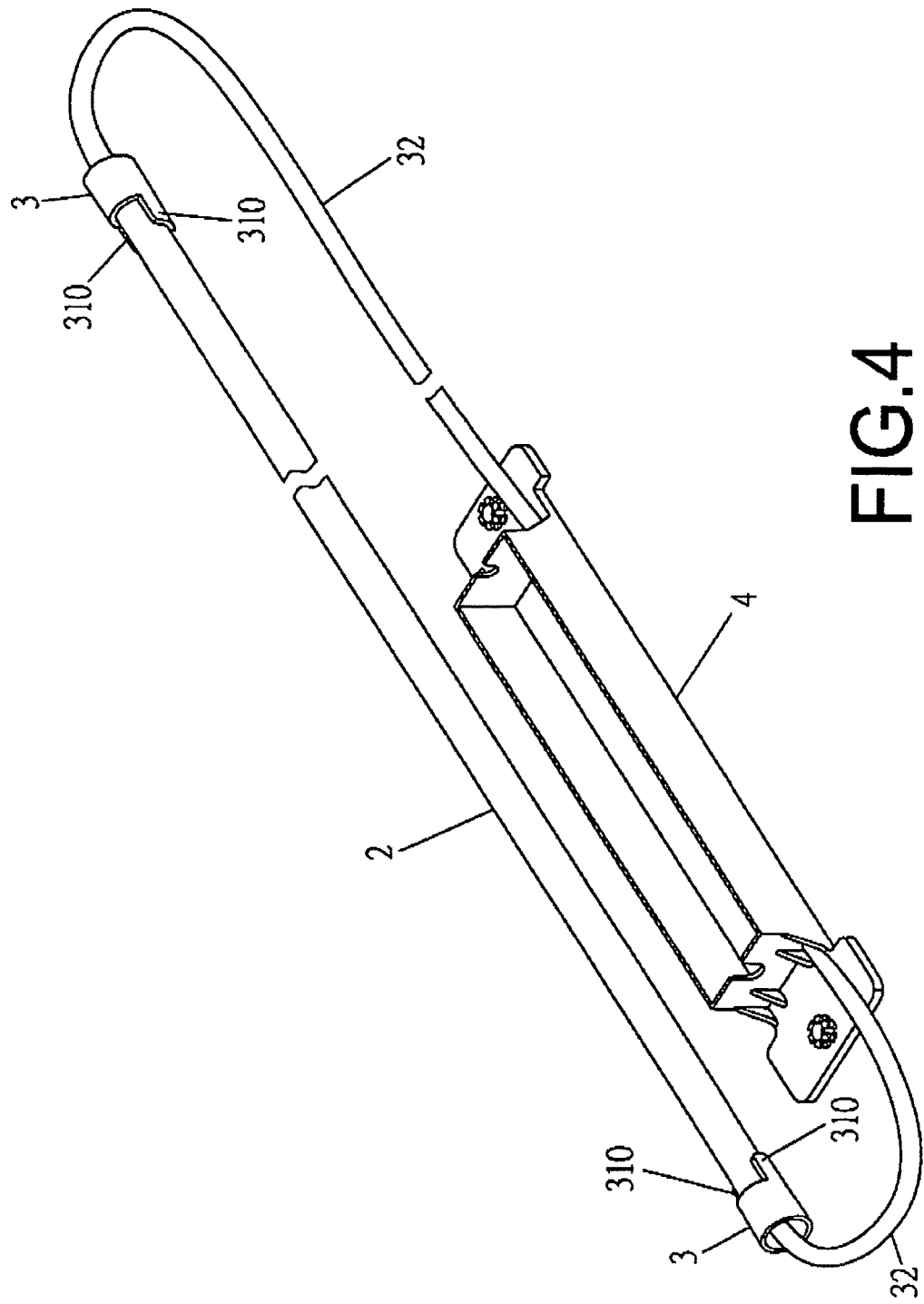
FIG. 4 is a schematic assembled view of the light device.
Figure 5:
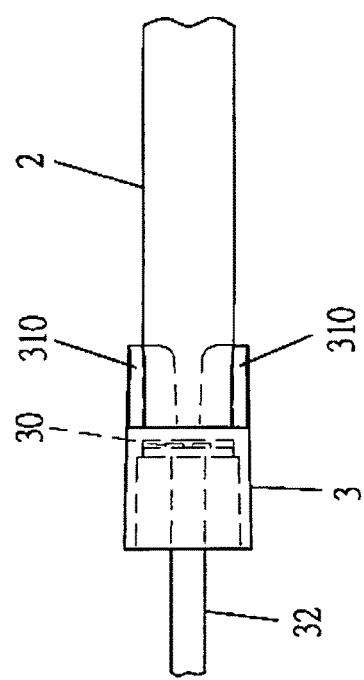
FIG. 5 is a schematic plan view showing a holder and a light-guiding tube used in the light device.

While assembling, referring to FIG. 2~4, the two holders 3 are detachably mounted over two ends of the light-guiding tube 2; namely, each end of the light-guiding tube 2 is detachably fitted into the receiving space 310' of one of the two holders 3, wherein each LED unit 30 faces one end of the light-guiding tube 2, so that light rays emitting from the LED unit may enter the tube. Each of the two cables 32 is provided between one of the two holders 3 and the controller 4 for detachably connecting the LED unit 30 located in the holder with the controller 4. The light device of the present invention can be installed on a vehicle or used with various devices for a vehicle. For example, the light device can be employed in a running board or a warning light of a vehicle, or it can be installed beside a door of a vehicle.

In use, the light rays emitting from each LED unit 30 entering the light-guiding tube 2 allow the tube to appear as a long strip of light, so that the light device is suitable to be used as a warning light. When one LED unit 30 fails, the user simply pulls the corresponding holder 3, including the failed LED unit therein, out of the light-guiding tube 2 and then disconnects the corresponding cable 32 from the holder 3. In replacement, a new holder 3, including a new LED unit therein, can be mounted over the corresponding end of the light-guiding tube 2 and secured by the holding walls 310 of the new holder 3. Then, the cable 32, which has been previously removed from the original holder, can be inserted into the new holder 3 to allow the LED unit located in the new holder to be connected with the controller 4. Due to the holders 3 being able to be removed from the light-guiding tube 2 and the cables 32 to be replaced by a new one, the light device can be repaired easily and conveniently. There is no need to replace the entire light device, so that the light device can be repaired more easily and the cost can be reduced.

While the preferred embodiments of the invention have been described above, it will be recognized and understood that various modifications may be made therein and that the claims are intended to cover all such modifications that may fall within the spirit and scope of the invention.

What is claimed is:
1. A light device, comprising:
   a controller;
   a light-guiding tube;
   two holders each defining therein a receiving space, in which an LED unit is provided to serve as a light source, the two holders detachably mounted over two ends of the light-guiding tube, respectively, such that the LED unit located in each holder faces one end of the light-guiding tube, so that light rays emitting from the LED unit may enter the light-guiding tube; and two cables, each of which is provided between one of the two holders and the controller for detachably connecting the LED unit located in the holder with the controller;

whereby when one LED unit fails, the corresponding holder with the failed LED unit therein allows to be removed from the light-guiding tube and the associated cable to be replaced with a new one, so that the light device can be repaired more easily and the cost can be reduced.

2. The light device of claim 1, wherein each of the two holders is provided with two spaced-apart holding walls which surround the receiving space to facilitate the holder to be detachably mounted over one end of the light-guiding tube.

* * * * *